No. 780,161. PATENTED JAN. 17, 1905.
E. DENEGRE.
DUST GUARD.
APPLICATION FILED JAN. 8, 1904.
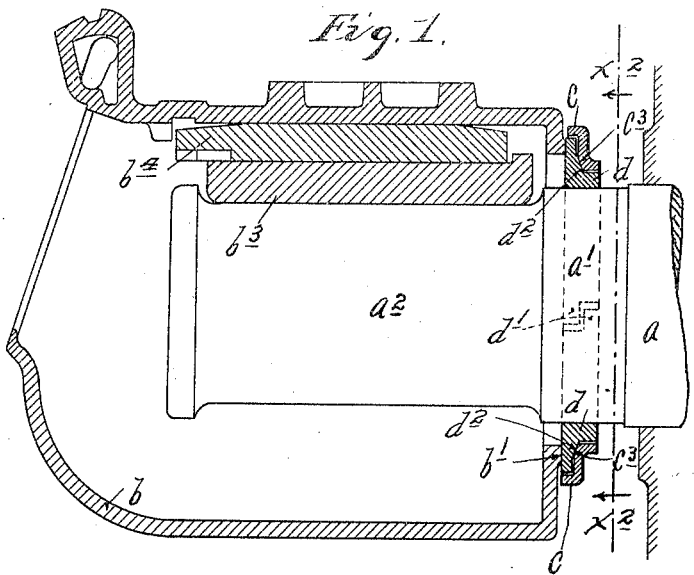
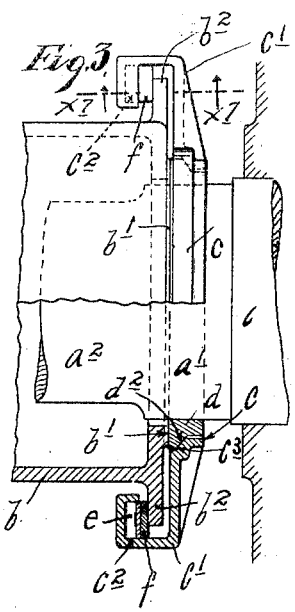
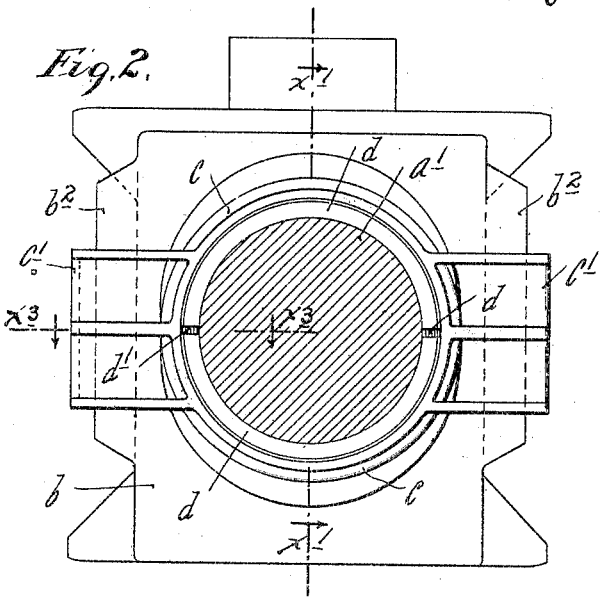
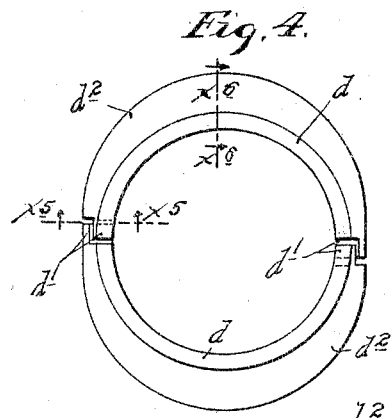
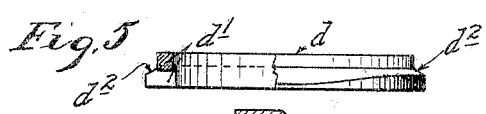
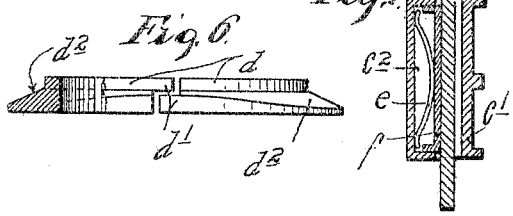
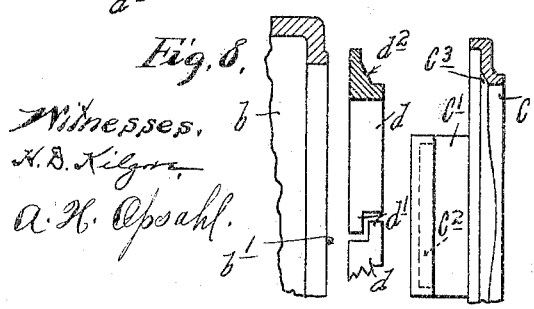
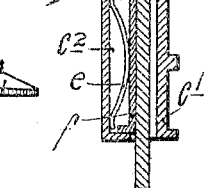
Witnesses,
H. B. Kilgore,
A. H. Opsahl.
Inventor,
Edward Denegre,
By his Attorneys,
Williamson & Merchant No. 780,161. Patented January 17, 1905.

UNITED STATES PATENT OFFICE.

EDWARD DENEGRE, OF CHICAGO, ILLINOIS, ASSIGNOR TO McCORD & COMPANY, OF CHICAGO, ILLINOIS, A CORPORATION OF NEW JERSEY.

DUST-GUARD.

SPECIFICATION forming part of Letters Patent No. 780,161, dated January 17, 1905.

Application filed January 8, 1904. Serial No. 188,158.

*To all whom it may concern:*

Be it known that I, EDWARD DENEGRE, a citizen of the United States, residing at Chicago, in the county of Cook and State of Illinois, have invented certain new and useful Improvements in Dust-Guards; and I do hereby declare the following to be a full, clear, and exact description of the invention, such as will enable others skilled in the art to which it appertains to make and use the same.

My invention has for its object to provide an improved dust-guard for car-axle journal-boxes; and to this end the invention consists of the novel devices and combinations of devices hereinafter described, and defined in the claims.

The invention is illustrated in the accompanying drawings, wherein like notations refer to like parts throughout the several views.

In said drawings, Figure 1 is a view in vertical longitudinal section, on the line $x'\ x'$ of Fig. 2, with some parts shown in elevation, some removed, and others broken away, illustrating my improved dust-guard in working position. Fig. 2 is a vertical cross-section on the line $x^2\ x^2$ of Fig. 1. Fig. 3 is a view, partly in plan and partly in horizontal section, on the line $x^3\ x^3$ of Fig. 2, some parts being broken away. Fig. 4 is a view in elevation showing the packing-ring detached. Fig. 5 is a detail, partly in edge view and partly in cross-section, on the line $x^5\ x^5$ of Fig. 4, showing the packing-ring detached. Fig. 6 is a similar view of the packing-ring, the section being on the line $x^6\ x^6$ of Fig. 4. Fig. 7 is a detail in cross-section on the line $x^7\ x^7$ of Fig. 3; and Fig. 8 is a detail in section in the same plane as Fig. 1, with some parts broken away, showing the packing-ring and the guard-plate detached from the box and pulled apart.

The reference-letters $a$, $a'$, $a^2$ represent the axle, the part $a$ being the body portion, the part $a^2$ the journal, and $a'$ the intermediate portion, subject to the dust-guard.

The box $b$ may be of the ordinary or any suitable construction, and is provided with a raised boss $b'$, surrounding the axle-passage at the rear end of the box, which boss $b'$ is machined or planed on its face and serves as the box-surface to be packed. Said box $b$ is also provided with lock-flanges $b^2$ on the sides of its rear end.

The reference-letters $b^3$ and $b^4$ represent, respectively, the brass and the key applied in the usual way.

The guard-plate is solid or integral, being made up of the main or body portion $c$ and hook-like lateral extensions or ear-lugs $c'$, the hook portions of which are adapted to engage with the lock-flanges $b^2$ of the box. The hook ends of the ear-lugs $c'$ are provided with spring-pockets $c^2$, in which are mounted the springs $e$ and suitable chafing-plates $f$.

The packing-ring $d$ is of sectional form, being shown as made up of two segments provided with suitable lap-joints $d'$. The packing-ring $d$ is interposed between the guard-plate and the box, and the inner profile face of the packing-ring is machined or planed and adapted to form a tight joint with the face of the box-boss $b'$. The guard-plate $c$ and the packing-ring $d$ are in cross-section of the shape best shown in Figs. 1, 2, 5, 6, and 8. Otherwise stated, the guard-plate is of the proper shape to embrace the packing-ring $d$ and afford a suitable seat for the same, with the hub of the packing-ring resting in the hub of the guard-plate and the inner surface thereof embracing the axle. The guard-plate is provided on its ring-seating surface with a beveled portion or surface $c^3$ for coöperation with the corresponding beveled surface $d^2$ on the body portion of the packing-ring $d$ when the parts are in working position.

The rings $e$ are of half-elliptic form and are applied, as best shown in Figs. 3 and 7, so as to react between the hook ends of the guard-lugs $c'$ and the chafing-plates $f$, which rest in the pockets $c^2$ of said hook-lugs and bear against the back faces of the box-flanges $b^2$. The chafing-plates $f$ are shown as of cup-like form in cross-section, so as to permit the same to be held in the pockets $c^2$ of the guard-plate hooks with freedom for a limited telescoping action in respect to the walls of said pockets without becoming disengaged therefrom, as clearly shown in Fig. 7.

In the act of making the hook-lugs of the guard-plate engage with the lock-flanges $b^2$ of the box the springs $e$ will be compressed and set under such tension that they will serve yieldingly to clamp the dust-guard to the box and to hold the packing-ring $d$ in its proper packing position both in respect to the box-surface and the axle-surface packed thereby. Otherwise stated, the springs $e$, in virtue of the coöperating beveled surfaces of the guard-plate and packing-ring, (marked, respectively, $c^3$ and $d^2$,) will deliver its tension on the packing-ring both in an axial and in a radial direction, thus serving to hold the face of the packing-ring tightly against the face of the box-boss $b'$ and to force the sections of the packing-ring $d$ toward each other as far as possible, thereby causing the same to hug the axle-surface packed thereby regardless of the wear and tear which may take place on the inner surface of the ring-segments under the service. The springs $e$ therefore serve a threefold function—to wit, first, to clamp the dust-guard to the box; second, to hold the packing-ring against the box-surface packed thereby, and, third, to hold the packing-ring segments to their innermost limit against the axle-surface packed thereby. It should further be noted that when the parts are in working position the springs $e$ are set under compression, as hitherto noted, and the resultant tension or friction in the clamping action is such that the weight or load of the dust-guard is at all times carried by the box, the axle being thus relieved from the wear and tear which would otherwise occur from the load of the dust-guard. Furthermore, it is of course obvious that the dust-guard constructed and applied as above described is free to move with the axle in respect to the box under the relative motions of these parts incidental to the service and that nevertheless a tight joint is always maintained at the box and axle surfaces to be packed.

The special purpose of the chafing-plates $f$ is to prevent any sliding wear and tear on the springs $e$. The springs $e$ and the chafing-plates $f$ of course always move together with the guard-plate in respect to the box, and hence all the sliding wear and tear will be taken on said chafing-plates $f$. The tension of the springs $e$ will therefore remain constant and they will last for a much longer time. Otherwise than for this desired result in protecting the springs $e$ the chafing-plates $f$ might be dispensed with and the springs be permitted to react directly between the hook of the guard-plate lugs $c'$ and the lock-flange $b^2$ of the box $b$.

It is further obvious that with a dust-guard constructed and applied as above none of the parts are exposed where they are liable to be tampered with, displaced, or lost. It should perhaps be noted that the beveled surfaces on the packing-ring and on the guard-plate (marked, respectively, $d^2$ and $c^3$,) run out or substantially run out directly opposite the lap-joints $d'$ of the ring-sections, or, otherwise stated, the bevel is greatest at the middle positions of the packing-ring sections. This secures the delivery of the radial tension from the springs $e$ in line with the lap-joints without wasting any thereof in any other direction, and prevents the turning of the packing-ring within the guard-plate.

By actual usage the efficiency of the dust-guard above described has been demonstrated for the purposes had in view.

What I claim, and desire to secure by Letters Patent of the United States, is as follows:

1. The combination with a journal-box, of a dust-guard comprising a guard-plate having means for engagement with the box, a sectional packing-ring interposed between the guard-plate and the box and serving to pack both the box and the axle, said guard-plate and said packing-ring being provided with beveled surfaces and springs serving yieldingly to clamp the dust-guard to the box and to coöperate with said beveled surfaces of the guard-plate and packing-ring, to hold the packing-ring tightly hugging both the box and the axle-surfaces packed thereby.

2. The combination with a journal-box, of a dust-guard having hook-like ear-lugs adapted to engage with the lock-flanges of the box, a sectional packing-ring interposed between the guard-plate and the box and serving to pack both the box and the axle, and springs reacting between the hook ends of the guard-lug and the backs of the box-flanges, the packing-ring and the guard-plate being provided with beveled surfaces through which the tension of the springs is delivered on the packing-ring in both an axial and a radial direction, substantially as and for the purposes set forth.

3. The combination with a journal-box, of a dust-guard comprising a guard-plate having hook-like ear-lugs adapted to engage with lock-flanges of the box, a packing-ring interposed between the guard-plate and the box and serving to pack both the box and the axle, springs mounted in pockets in the hook ends of said guard-plate ear-lugs and chafing-plates between the said springs and the box-flanges, all for coöperation substantially as described.

4. The combination with a journal-box, of a dust-guard comprising a guard-plate provided with hook-like ear-lugs adapted to engage with lock-flanges of the box and which ear-lugs have spring-pockets $c^2$, a sectional packing-ring interposed between the guard-plate and the box, said ring and said guard-plate being provided with coöperating beveled surfaces, half-elliptic springs $e$ and suitable chafing-plates $f$ seated in the pockets $c^2$ of the guard-plate hooks, the said springs thus serving yieldingly to clamp the dust-guard to the box and to deliver their tension onto the packing-ring in both an axial and a radial direction and being protected by said chafing-plates from any sliding wear and tear thereon, all substantially as described.

5. The combination with a journal-box, of the guard-plate $c$ having the hook-like ear-lugs $c'$ with spring-pockets $c^2$, the sectional packing-ring $d$ and the half-elliptic springs $e$ mounted in said pockets $c^2$ and reacting between the hook ends of the guard-plate lugs and the back of the lock-flanges $b^2$ of the box, and the said packing-ring and the said guard-plate being provided, respectively, with the beveled surfaces $b^3$ and $c^3$, for coöperation with each other and said springs, and which beveled surfaces run out at points opposite the lap-joints of the sectional packing-ring, substantially as and for the purposes set forth.

In testimony whereof I affix my signature in presence of two witnesses.

EDWARD DENEGRE.

Witnesses:
ROBERT C. MABEY,
JAMES D. DENEGRE.